(12) United States Patent  (10) Patent No.: US 8,799,259 B2
Ahola  (45) Date of Patent: Aug. 5, 2014

(54) METHOD AND APPARATUS FOR QUALITY RANKING OF MEDIA

(75) Inventor: Tom Mikael Ahola, Helsinki (FI)

(73) Assignee: Core Wireless Licensing, S.a.r.l., Luxembourg (LU)

( * ) Notice: Subject to any disclaimer, the term of this patent is extended or adjusted under 35 U.S.C. 154(b) by 465 days.

(21) Appl. No.: 12/266,904

(22) Filed: Nov. 7, 2008

(65) Prior Publication Data

US 2010/0121834 A1    May 13, 2010

(51) Int. Cl.
*G06F 17/30* (2006.01)

(52) U.S. Cl.
USPC ........... 707/708; 707/723; 707/737; 707/913; 382/175; 382/243

(58) Field of Classification Search
None
See application file for complete search history.

(56) References Cited

U.S. PATENT DOCUMENTS

| | | | | |
|---|---|---|---|---|
| 5,579,471 A * | 11/1996 | Barber et al. | | 715/700 |
| 6,115,717 A * | 9/2000 | Mehrotra et al. | | 1/1 |
| 6,480,840 B2 * | 11/2002 | Zhu et al. | | 1/1 |
| 6,804,683 B1 * | 10/2004 | Matsuzaki et al. | | 1/1 |
| 6,970,859 B1 * | 11/2005 | Brechner et al. | | 1/1 |
| 2003/0051214 A1 * | 3/2003 | Graham et al. | | 715/512 |
| 2004/0267740 A1 * | 12/2004 | Liu et al. | | 707/3 |
| 2005/0168460 A1 * | 8/2005 | Razdan et al. | | 345/419 |
| 2007/0209025 A1 * | 9/2007 | Jing et al. | | 715/968 |
| 2009/0024580 A1 * | 1/2009 | Obrador | | 707/3 |

OTHER PUBLICATIONS

Author: Le Meur et al.; Publication No. WO2006/125721A1; "Method for assessing image quality"; Date: Nov. 30, 2006; Publisher: World Intellectual Property Organization; Pertinent pp. 1-20 (whole document as attached).*
Yuanji, W. et al., "Image Quality Evaluation Based on Image Weighted separating Block Peak Signal to Noise Ratio," IEEE Int. Conf. Neural Networks & Signal Processing, Nanjing, China, Dec. 14-17, 2003, pp. 994-997.
Zhang, L. et al., "EnjoyPhoto—A Vertical Image Search Engine for Enjoying High-Quality Photos," MM'06, Santa Barbara, California, USA, Oct. 23-27, 2006, ACM I-59593-447-2 (2006) 10 pp.

* cited by examiner

*Primary Examiner* — Anh Tai Tran

(57) ABSTRACT

In accordance with an example embodiment of the present invention, an apparatus comprises a processor configured to determine at least one quality parameter for a media, assign a value to each quality parameter of the media, calculate a quality score for the media based at least in part on the value for each quality parameter, receive a search request, and transmit search results based at least in part on the quality score of the media.

20 Claims, 6 Drawing Sheets

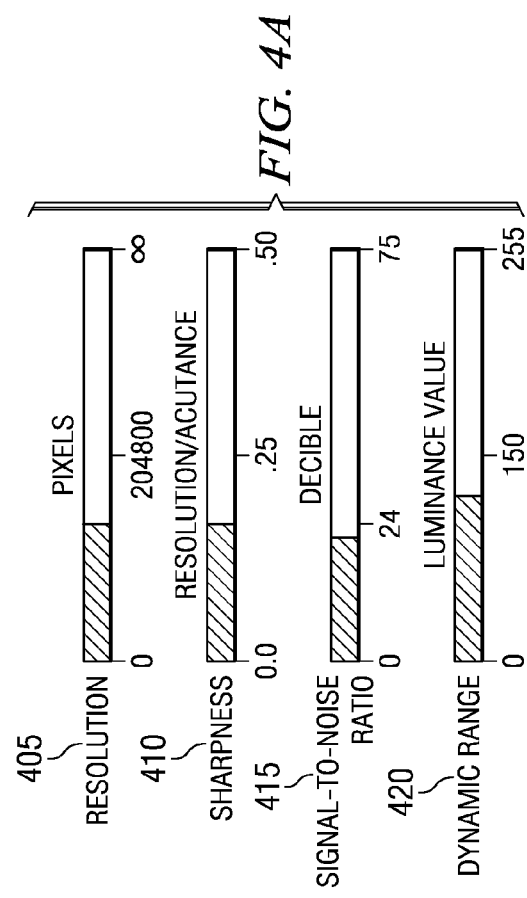
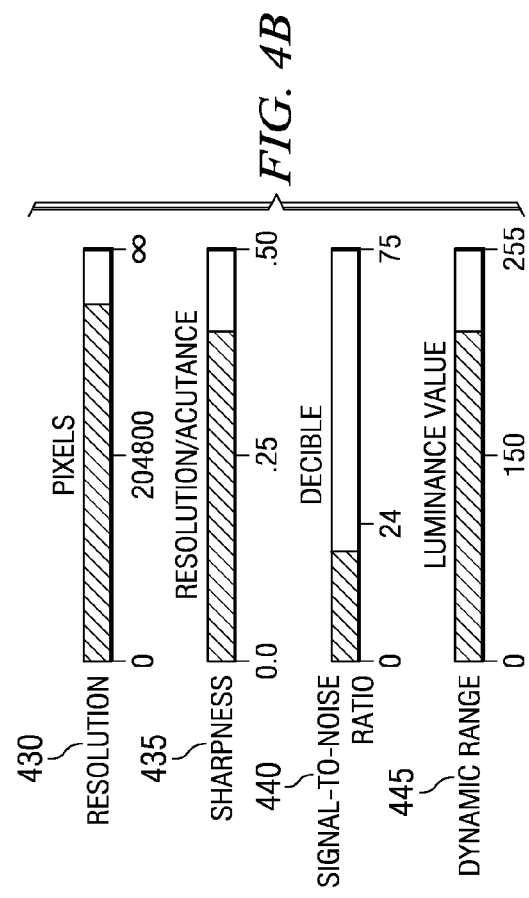
FIG. 4A
FIG. 4B

METHOD AND APPARATUS FOR QUALITY RANKING OF MEDIA

TECHNICAL FIELD

The present application relates generally to ranking media according to quality.

BACKGROUND

Today networks, such as the Internet, are widely used for sharing media. Users can search for media using search engines or the like. As a result of the search, the user is presented with many different media for review. The searching, however, is still limited.

SUMMARY

Various aspects of the invention are set out in the claims.

According to a first aspect of the present invention, an apparatus comprises a processor configured to determine at least one quality parameter for a media, assign a value to each quality parameter of the media, calculate a quality score for the media based at least in part on the value for each quality parameter, receive a search request, and transmit search results based at least in part on the quality score of the media.

According to a second aspect of the present invention, a method comprises determining at least one quality parameter for a media, assigning a value to each quality parameter of the media, calculating a quality score for the media based at least in part on the value for each quality parameter, receiving a search request, and transmitting search results based at least in part on the quality score of the media.

According to a third aspect of the present invention, an apparatus comprises a processor configured to issue a search request, receive search results based at least in part on a quality score, and present the media.

According to a fourth aspect of the present invention, a method comprises issuing a search request, receiving search results based at least in part on a quality score, and presenting the media.

BRIEF DESCRIPTION OF THE DRAWINGS

For a more complete understanding of example embodiments of the present invention, reference is now made to the following descriptions taken in connection with the accompanying drawings in which:

FIG. 4A is a diagram depicting a media with assigned values for quality parameters in accordance with an example embodiment of the invention;

FIG. 4B is a diagram depicting another media with assigned values for quality parameters in accordance with an example embodiment of the invention.

DETAILED DESCRIPTION OF THE DRAWINGS

An example embodiment of the present invention and its potential advantages are best understood by referring to FIGS. 1 through 4C of the drawings.

Figure 1:
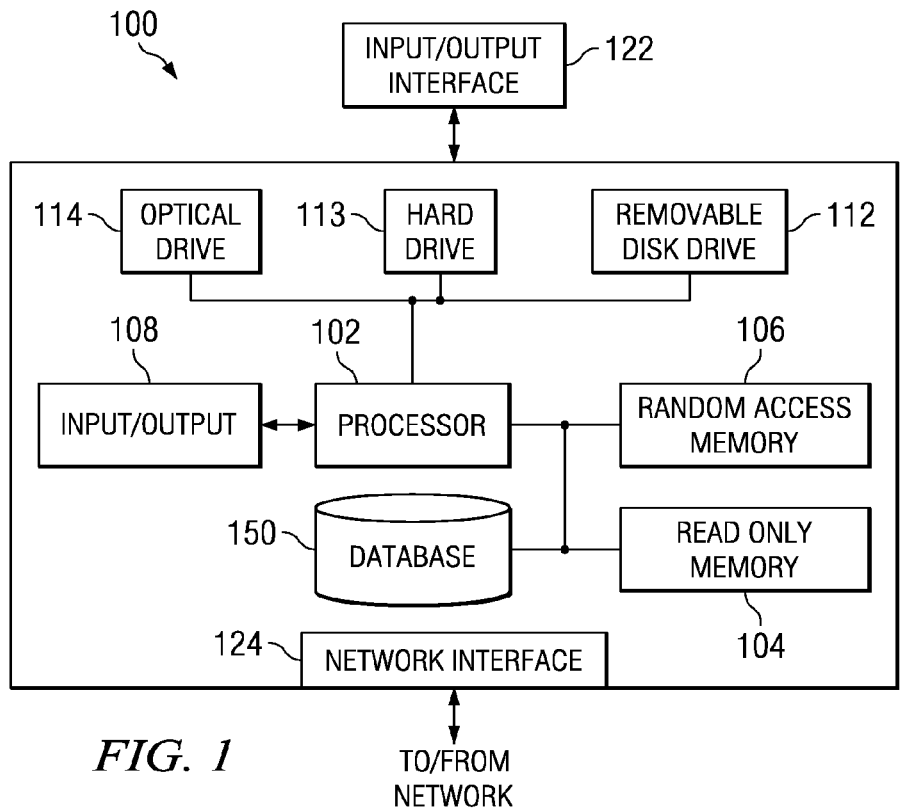
FIG. 1 is a block diagram depicting a server operating in accordance with an example embodiment of the invention.

FIG. 1 is a block diagram of a server 100 operating in accordance with an example embodiment of the present invention. In an example embodiment, the server 100 comprises a processor 102 and/or a database. In an embodiment, the server 100 and/or the processor 102 comprises memory. For example, the server 100 comprises volatile memory, such as random access memory (RAM) 106. RAM may comprise a cache area for the temporary storage of data. Further, the server 100 may also comprise non-volatile memory, such as read only memory (ROM) 104, which may be embedded and/or may be removable. The non-volatile memory may also comprise an electrically erasable programmable read only memory (EEPROM), flash memory, and/or the like.

In an embodiment, the processor 102 communicates with internal and/or external components through the input/output circuitry 108. Further, the processor 102 may carry out a variety of techniques, as dictated by software instructions, firmware instructions, and/or the like.

In an embodiment, the server 100 comprises one or more data storage devices, such as a removable disk drive 112, a hard drive 113, an optical drive 114, other hardware capable of reading and/or storing information, and/or the like. In an embodiment, software for carrying out operations stores and/or distribute on an optical media, a magnetic media, a flash memory, or other form of media capable of storing information, and/or the like. The optical media, magnetic media, flash memory, and/or the like may be inserted into, and/or read by, devices, such as the optical drive 114, the removable disk drive 112, the input/output circuitry 108, and/or the like.

In an embodiment, the server 100 is coupled to an input/output interface 122 for user interaction. The input/output interface 122 may comprise a mouse, keyboard, microphone, touch pad, touch screen, voice-recognition system, monitor, light-emitting diode (LED) display, liquid crystal display (LCD), and/or the like. In an alternative embodiment, the user input/output interface 122 is two separate interfaces.

In an embodiment, the server 100 is configured with software that may be stored on any combination of RAM 106 and persistent storage (e.g., hard drive 113). Such software may be contained in fixed logic or read-only memory 104, or placed in RAM 106 via portable computer readable storage media such as read-only-memory magnetic disks, optical media, flash memory devices, and/or the like. In an alternative embodiment, the software is stored in RAM 106 by way of data transmission links coupled to the input/output circuitry 108. Such data transmission links may comprise wired/wireless network interfaces, universal serial bus (USB) interfaces, and/or the like.

In an embodiment, the server 100 comprises a network interface 124 for interacting with client and server entities via a network. The network interface 124 may include a combination of hardware and software components, including media access circuitry, drivers, programs, and protocol modules.

While embodiments of the server 100 is illustrated and will be hereinafter described for purposes of example, other types of servers and/or electronic devices, such as a portable digital assistant (PDA), a pager, a mobile television, a gaming device, a camera, a video recorder, an audio player, a video player, a radio, a mobile telephone, a portable computer device, a global positioning system (GPS) device, a GPS navigation device, a GPS system, a mobile computer, a browsing device, an electronic book reader, a combination thereof, and/or the like, may be used. While several embodiments of the invention may be performed or used by the server 100, embodiments may also be employed by an electronic device, a service, a combination thereof, and/or the like.

Figure 2A:
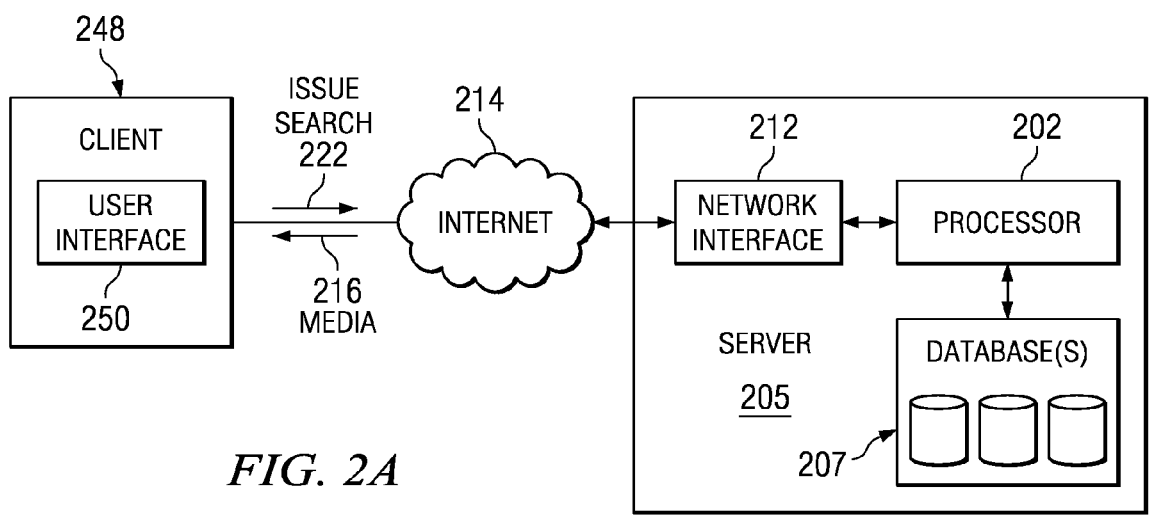
FIG. 2A is a block diagram of a server and a client operating in accordance with an example embodiment of the invention.

FIG. 2A is a block diagram of a server 205 and a client 248 operating in accordance with an example embodiment of the invention. In an example embodiment, a client 248 comprises a user interface 250. In an example embodiment, a server 205 comprises a network interface 212, processor 202, and one or more databases 207. The server 205 may be in communication with the client 248, via a network, such as Internet 214. For example, the client 248 may issue a search 222, e.g., a search request, for media over the Internet 214. The network interface 212 of the server 205 may be configured to receive the search 222. The processor 202 may be configured to perform as described below. The processor 202 may also be configured to transmit media associated with the search, via the network interface 212, over the Internet 214 to the client 248. In an alternative embodiment, the processor 202 performs a look-up or otherwise access data in the database 207 to determine the media associated with the issued search 222.

Figure 2B:
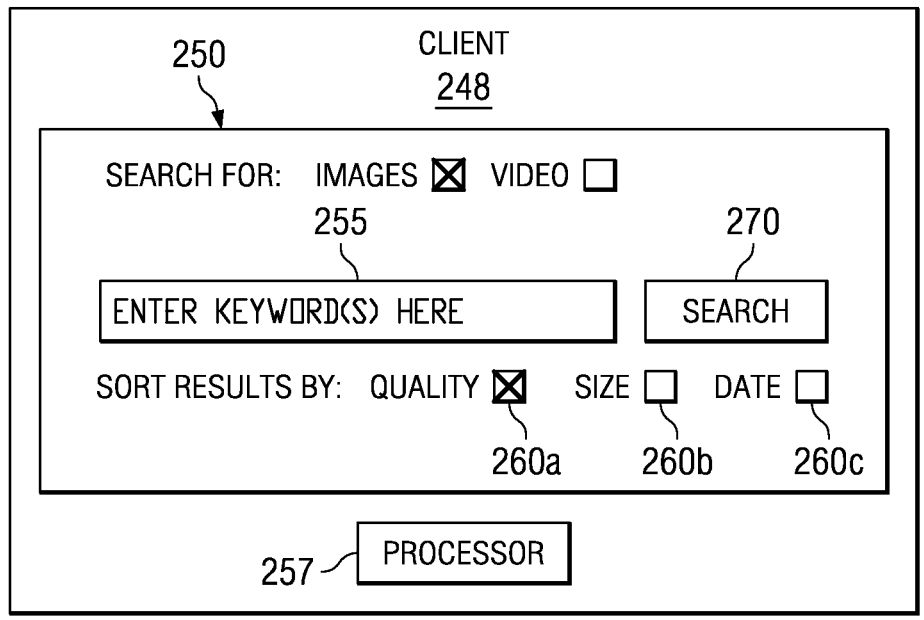
FIG. 2B is a block diagram of a user interface operating in accordance with an example embodiment of the invention.

FIG. 2B is a block diagram of a user interface 250 operating in accordance with an example embodiment of the invention. In an example embodiment, a client 248 comprises a user interface 250 and/or a processor 257. The client 248 may be configured to receive instructions for display from a server, such as server 205. For example, the client 248 receives a display comprising an input box 255, search criteria, a search button and/or the like. In an alternative embodiment, a service comprises a user interface 250 and/or a processor 257. The service may be configured to receive instructions for display from a server, such as server 205. For example, the service receives a display comprising an input box 255, search criteria, a search button and/or the like.

In an example embodiment, the user interface 250 is configured to display the input box 255, the search criteria, the search button 270, and/or the like for a user to perform a media search. In an example embodiment, the media search is based at least in part on a keyword, a media type, and/or the like. In an embodiment, the user interface 250 is further configured to allow selection of a type of a media search based at least in part on search criteria, such as quality 260a, size 260b, date 260c, a reference media, and/or the like, of a media. In an embodiment, the media search is for an image, video, and/or the like.

In an example embodiment, the user interface 250 is configured to enable initiation of a media search using a search button 270. The user interface 250 may also be configured to provide a radio button, a check box, an input for a numerical representation relating to a quality parameter, a drawing curve relating to weight for the quality parameter, and/or the like.

In an embodiment, the processor 257 is configured to issue a search request for media. For example, the processor 257 issues the search request based on at least in part on user input, such as a keyword entry in the input box 255, to a server, such as server 205 of FIG. 2A. In an embodiment, the processor 257 is configured to search the media based at least in part on one of the following: the quality score, a keyword, a title, a description text, a combination thereof, and/or the like. For example, the processor 202 may issue a search based at least in part on the quality score of the media 210, e.g., search for good images, or from a keyword search, e.g., mobile phone. In an embodiment, the processor 257 is configured to receive search results based at least in part on a quality score. A possible technical effect of the example embodiment is a more efficient searching for a user, e.g., less searching for quality media on slower processing devices.

Figure 2C:
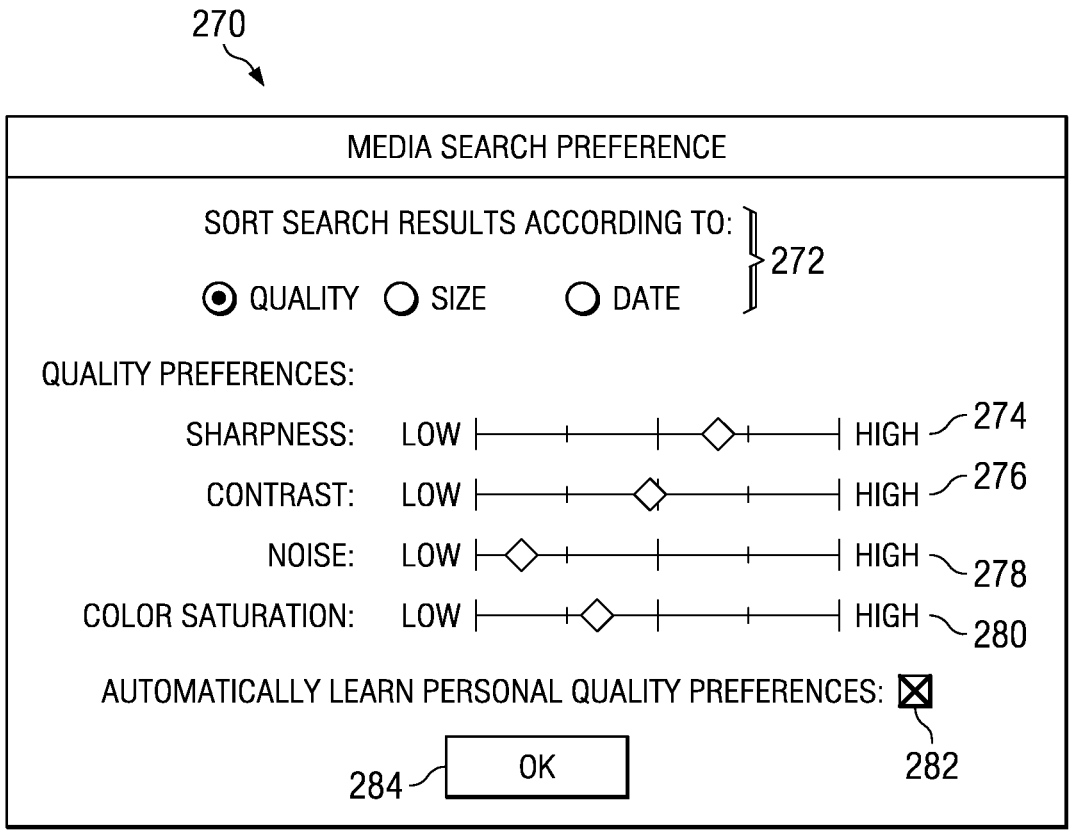
FIG. 2C is a block diagram of another user interface operating in accordance with an example embodiment of the invention.

In an alternative embodiment, the processor 257 issues the search request based on at least in part on user input, such as a keyword entry in the input box 255, to a server, such as server 205 of FIG. 2A or 2C. In an example embodiment, the user interface 250 is configured to present or otherwise display the search results of the processor 257. Consider the following example.

In an example embodiment, a user of the user interface 250 enters a keyword, e.g., flower, in the input box 255. Further, the user may select the type of media search, for example, quality 260a. The user interface may also press or otherwise select the search button 270 to initiate the search. The processor 257 may issue the search request. Further, the processor may receive search results based at least in part on a quality from the server. The processor 257 may present the media, for example, on a user interface 250. A possible technical effect of the example embodiment is to search media based at least in part on quality of the media.

FIG. 2C is a block diagram of another user interface 270 operating in accordance with an example embodiment of the invention. In an example embodiment, the user interface 270 is configured to display a widget, such as a selection widget. The display may be configured to allow a sort selection 272 for sorting the search results according to quality, size, date and/or the like. In an embodiment, the user interface 270 is further be configured to display one or more quality widgets for setting user preferences for sharpness 274, contrast 276, noise 278, color saturation 280, and/or the like. In an example embodiment, a user of the user interface 270 saves the media search preferences by pressing or otherwise selecting a button 284.

In an embodiment, the user interface 270 is further be configured to enable automatic learning or adaptation of quality preferences using an indicator 282. For example, a user selects a checkbox to enable adaptation. In an example embodiment, a service on the server is configured to automatically determine user quality preferences based at least in part on monitoring user behavior. For example, the service may monitor user selections for viewing media, such as media with low color saturation 280 in favor of media with color saturation 280. The service may determine a low color saturation preference setting for the user. In an embodiment, the service also continues to monitor user behavior. The service may adapt the quality preferences according to changed user behavior.

Figure 2D:
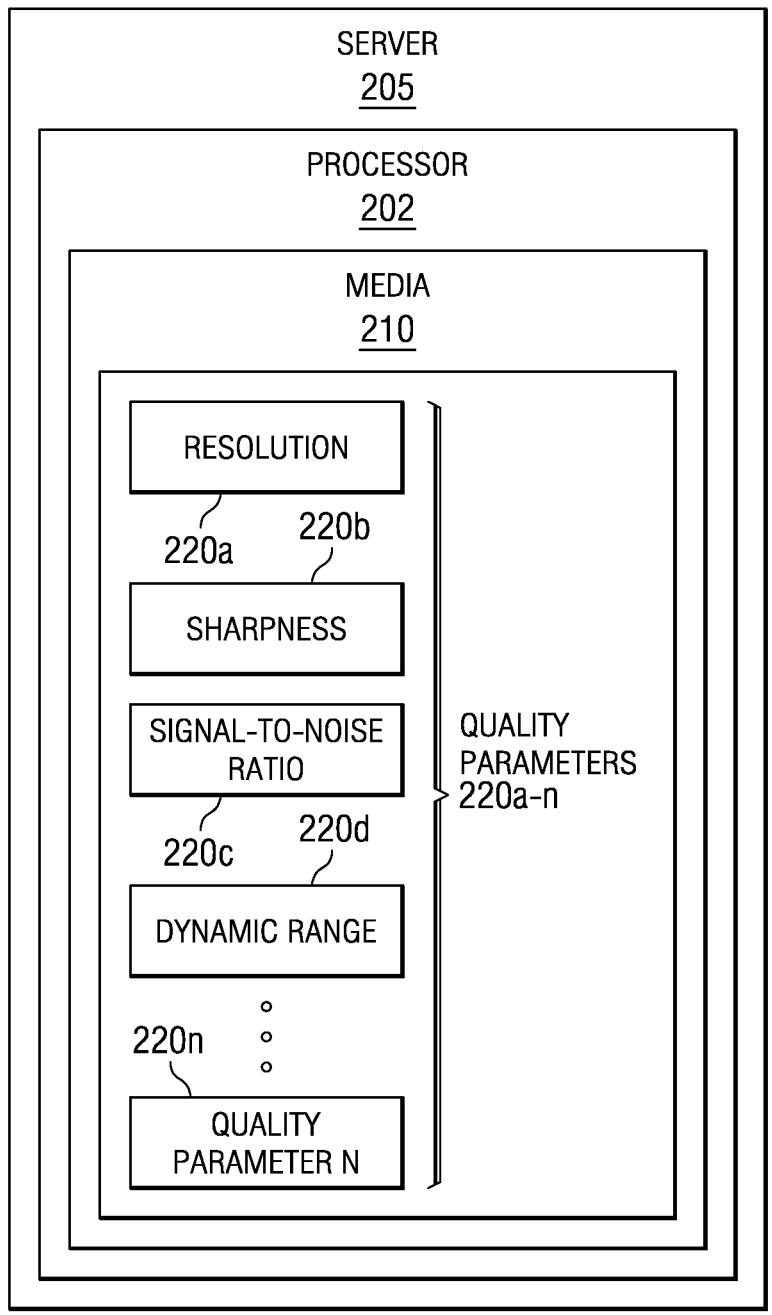
FIG. 2D is a block diagram of a server operating in accordance with an example embodiment of the invention.

FIG. 2D is a block diagram of a server 205 operating in accordance with an example embodiment of the invention. In an example embodiment, a server 205 comprises a processor 202 and/or media 210.

In an example embodiment, the media 210 comprises one or more quality parameters 220a-n. For example, the media 210 comprises at least one of the following quality parameters: resolution 220a, sharpness 220b, signal-to-noise ratio 220c, dynamic range 220d, tonal balance, color balance, distortion, light falloff, lateral chromatic aberration, veiling glare, horizontal alignment, vertical alignment, facial detection, and/or the like. Media 210 may also comprise other quality parameters.

In an example embodiment, resolution 220a represents a number of pixels for the media 210. In this example embodiment, a resolution 220a has a pixel count of less than 204800, e.g., 640×320 resolution, may be considered low. In an embodiment, resolution 220a is identified as a physical size, e.g. lines per millimeter, lines per inch, and/or the like, pixels, an overall size of the media 210, e.g., lines per picture height, and/or the like. In an example embodiment, a resolution of ten lines per millimeter comprises five dark lines alternating with five light lines.

In an example embodiment, sharpness 220b determines the clarity of the media 210. sharpness 220b of the media 210 may be determined based at least in part on the resolution 220a and an acutance of the media 210. In an embodiment, the acutance comprises a speed that the media 210 information transitions at an edge or the like. The combination of resolution 220a, e.g., clarity, and the acutance, e.g., speed of transition, sharpness 220b results in the sharpness 220b of the media 210. In an example embodiment, the sharpness 220b has a value from 0.0, e.g., low sharpness, to 1.0, e.g., good sharpness. For example, the sharpness 220b may have a resolution 220a for a five megapixel image in one megapixel, e.g., 0.2 sharpness. A sharpness of less than 0.5 may be considered low. It should be understood that sharpness may be affected by a lens and/or sensor of a device capturing the media 210, a camera shake, a focus accuracy, an atmospheric disturbance, e.g., thermal effects, aerosols, and/or the like, and/or the like.

In an embodiment, signal-to-noise ratio 220c is a variation of image density in a media 210. In an example embodiment, the signal-to-noise ratio 220c is described in decibels (dB) or effective number of bits (ENOB). If the ENOB is 8 or more, e.g., approx 48 dB, the quality is good. If the ENOB is less than 4, e.g., 24 dB, the signal-to-noise ratio 220c is low.

In an example embodiment, dynamic range 220d is a luminance value comprising a range of light levels the server 205 may capture for the media 210. The luminance value may be measured in f-stops, exposure value, zones, and/or the like. In an example embodiment, the dynamic range 220d comprises a minimum and a maximum 8-bit luminance value with the dynamic range 220d between 0 and 255. A media 210 with a value for the dynamic range 220d of above 150 is good.

In an example embodiment, a quality parameter is a vertical alignment. The vertical alignment may be an arrangement or position in a straight line, a parallel line, and/or the like, in a position perpendicular to the plane of a horizon. In an alternative embodiment, a quality parameter is a horizontal alignment. The horizontal alignment may be an arrangement in a straight line, a parallel line, and/or the like in a position perpendicular to a plane of the horizon.

In an embodiment, a quality parameter is facial detection. For example, the quality parameter may indicate if a face is happy, sad, neutral, and/or the like. Further, the quality parameter may indicate other attributes of a face, such as open eyes.

It should be understood that the processor 202 may use techniques known in the art for determining the value for each quality parameter 220a-n. It should be further understood that the value for each quality parameter 220a-n representing a good, average, low, and/or the like value may be varied based at least in part on the use of the media 210. It should also be understood that embodiments of the invention performed with a video may apply the quality parameters for each frame of a video.

In an example embodiment, the processor 202 is configured to determine at least one quality parameter for the media 210 on the server 205 associated with the search request. For example, the processor 202 may determine the resolution 220a, the sharpness 220b, the signal-to-noise ratio 220c, the dynamic range 220d, and/or the like for the media 210. The processor 202 may be configured to assign a value, e.g., representing a good or a low quality, for each quality parameter 220a-n of the media 210. For example, the processor 202 may assign a low numerical value representing a low resolution 220a for the media 210. In an embodiment, the processor 202 is further configured to apply a weight to the value of each quality parameter.

In an example embodiment, the processor 202 is also configured to calculate a quality score for the media 210 based at least in part on each value for each of the quality parameters 220a-n.

In an embodiment, the processor 202 is further configured to apply a weight to the value of each quality parameter. The processor 202 may also be configured to combine the weighted value of each quality parameter using a combination technique, such as addition, multiplication, or using fuzzy logic. For example, the processor 202 may add the weighted value for each quality parameter 220a-n to calculate the quality score. Alternatively, the processor 202 may multiply the weighted value for each quality parameter 220a-n to calculate the quality score.

In an alternative embodiment, each quality parameter 220a-n is processed with a nonlinear function having a knee point, e.g., threshold value for a good quality score. In an embodiment, the knee point may be a pre-determined value or set by the user representing good quality. If desirable, the processor 202 may be configured to apply a piecewise linear function, a transcendental function, an algebraic function, fuzzy logic, and/or the like, to determine a quality score for the media 210. In an embodiment, the transcendental function is a logarithm function, an exponential function, and/or the like. In an embodiment, the algebraic linear function is a polynomial function.

In an example embodiment, a piecewise linear function is f: $\Omega \rightarrow V$, where V is a vector space and $\Omega$ may be subset of a vector space. The piecewise linear function may be any function with the property that $\Omega$ can be decomposed into finitely many polytopes, such that f is equal to a linear function on each of these polytopes. Embodiments of the invention use the piecewise linear function as known in the art to generate a nonlinearized representation of the quality parameters 220a-n. Based at least in part on the nonlinearized representation, the processor 202 may calculate the quality score.

In an alternative embodiment, the processor 202 is configured to compare one or more quality parameters of the media 210 to one or more quality parameters of a reference media. In an embodiment, the reference media is a known good representation of the media 210. For example, the processor 202 may determine a difference in value for each quality parameter of the media 210 and the reference media. The processor 202 may be configured to calculate a quality score based at least in part on the comparison between the media 210 and the reference media. For example, the processor 202 may add the difference in value to calculate a quality score. The processor 202 may determine any value less than, for example, a pre-defined amount is of low quality.

In an embodiment, the processor 202 is also be configured to rank the media 210 based at least in part on the keyword, quality score, or the like. In an embodiment, the processor 202 is configured to sort the media based at least in part on a ranking. Further, the processor 202 may be configured to sort the media based at least in part on the quality score. In an embodiment, the processor 202 is configured to store the quality score in a database. In an embodiment, a database is a collection of data organized for convenient access. In an example embodiment, the processor 202 is further configured to access the quality score during a subsequent search instead of calculating a new quality score.

In an example embodiment, the processor 202 is configured to receive a search request from a client, such as client 248 of FIG. 2B. In an example, the processor 202 of the server 205 may use a search engine to examine an index to provide a listing of best-matching media based at least in part on the search research request. If desired, the search engine may rank the media to provide the best results based at least in part on the search criteria. For example, the search engine may provide the best quality media for the keyword entered in the input box 255. In an example embodiment, the processor 202 is also configured to transmit search results based at least in part on the quality score of the media.

In an example embodiment, server 205 is similar to server 100, processor 202 is similar to processor 20, and user interface 250 is similar to display 28. In an alternative embodiment, server 205, processor 215, and user interface 250 is different than server 100, processor 20, and display 28.

Figure 3:
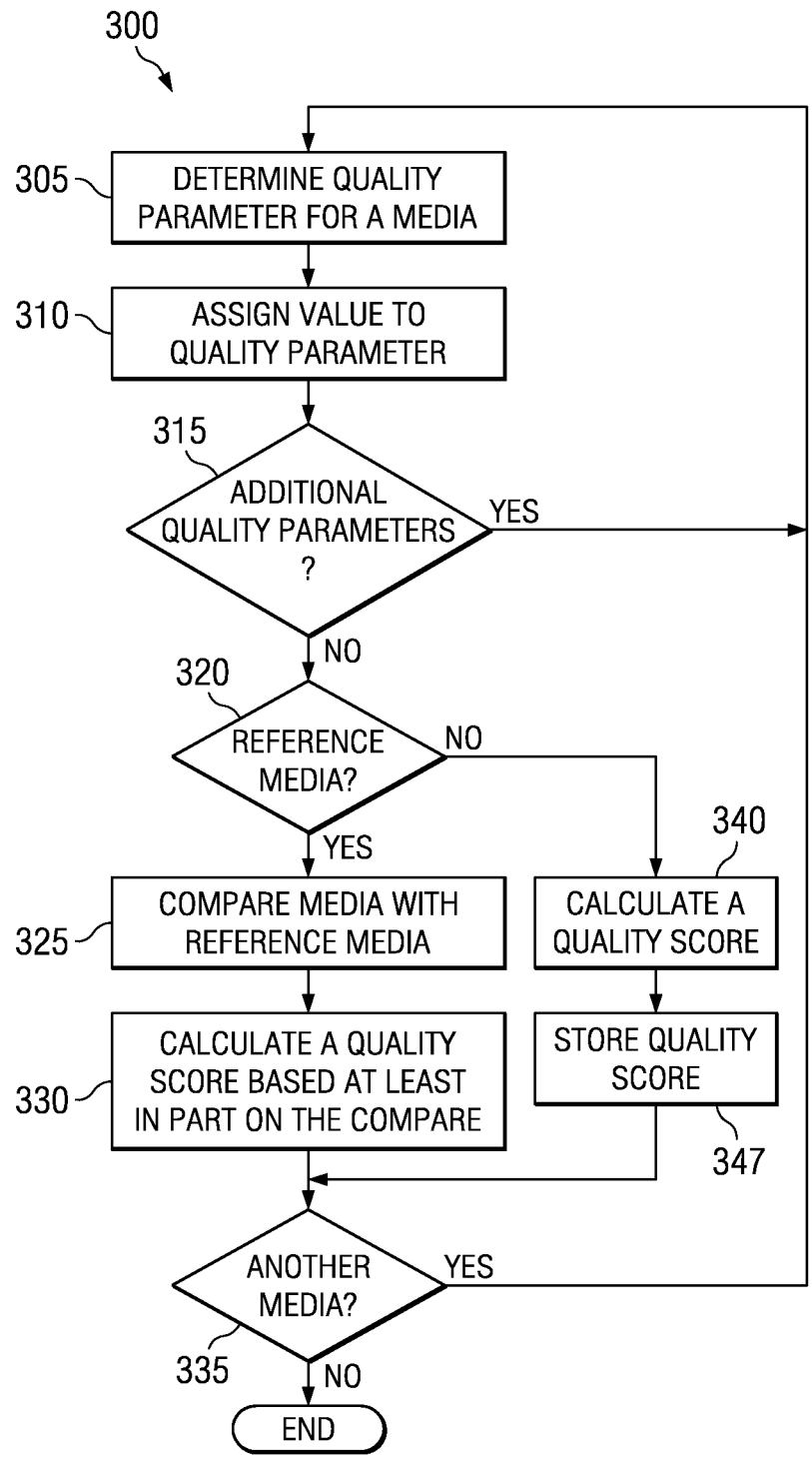
FIG. 3 is a flow diagram of an example method for ranking media in accordance with an example embodiment of the invention.

FIG. 3 is a flow diagram of an example method 300 for ranking media in accordance with an example embodiment of the invention. In an embodiment, the example method 300 may be performed using a server, such as server 205 of FIG. 2B.

In an example embodiment, a quality parameter for a media is determined at 305. In an example embodiment, the processor determines sharpness for an image. At 310, a value is assigned to the quality parameter. In an example embodiment, the processor is configured to assign a numeric value representing good sharpness. At 315, it is determined whether there are additional quality parameters. If at 315 it is determined that there are additional quality parameters, then the example method 300 continues at 305. If at 315 it is determined that there are no additional quality parameters, then the example method 300 continues at 320.

At 320 it is determined whether there is a reference media. If at 320, it is determined that there is a reference media, then at 325 the media is compared with the reference media. In an example embodiment, the image is compared to a known good image. At 330, a quality scored based at least in part on the comparison is calculated. In an example embodiment, the processor calculates a quality score based at least in part on the different in value for each quality parameter of the image as compared to a known good image.

At 335, it is determined whether there is another media to be processed. If at 335 it is determined that there is another media is to be processed, then the example method continues at 305. If at 335 it is determined that there is not another media to be processed, then the example method 300 ends.

If it is determined at 320 that there is no reference media, then at 340, a quality score is calculated. In an example embodiment, the processor calculates a quality score based at least in part on one or more quality parameters. At 347, the quality score is stored. In an example embodiment, the processor stores the quality in a database.

At 335, it is determined whether there is another media to be processed. If at 335 it is determined that there is another media is to be processed, then the example method continues at 305. If at 335 it is determined that there is not another media to be processed, then the example method 300 ends.

It should be understood that example method 300 may be employed for any number of quality parameters, reference media, media, and/or the like.

FIG. 4A is a diagram depicting a media 400 with assigned values for quality parameters in accordance with an example embodiment of the invention. In an example embodiment, FIG. 4A presents a media 400 and/or respective quality parameters, resolution 405, sharpness 410, signal-to-noise ratio 415, and dynamic range 420. The values for each quality parameter 405, 410, 415, 420 may be determined by performing embodiments of the invention. In this example, the resolution 405 has a pixel value of less than 204800, which may represent a low resolution 405. Further, the sharpness 410 has a resolution/acutance value of less than 0.25, which may represent low sharpness 410. The signal-to-noise ratio 415 has a decibel value of less than 24 decibels, which may represent a low signal-to-noise ratio 415. The dynamic range 420 has a luminance value of less than 150, which may represent a low dynamic range 420. Embodiments of the invention calculate a quality score, as described above, based at least in part on the quality parameters 405, 410, 415, 420. Since each of the quality parameters 405, 410, 415, 420 are low, the calculated quality score for the media 400 may be a low quality score value.

FIG. 4B is a diagram depicting another media 425 with assigned values for quality parameters in accordance with an example embodiment of the invention. In an example embodiment, FIG. 4B presents a media 425 and/or respective quality parameters, resolution 430, sharpness 435, signal-to-noise ratio 440, and dynamic range 445. The values for each quality parameter 430, 435, 440, 445 may be determined by performing embodiments of the invention. In this example, the resolution 430 has a pixel value above 204800, which may represent a good resolution 430. Further, the sharpness 435 has a resolution/acutance value of more than 0.25, which may represent a good sharpness 435. The signal-to-noise ratio 440 has a decibel value of less than 24 decibels, which may represent a low signal-to-noise ratio 440. The dynamic range 445 has a luminance value greater than 150, which may represent a good dynamic range 445. Embodiments of the invention calculate a quality score, as described above, based at least in part on the quality parameters 430, 435, 440, 445. Since several quality parameters 430, 435, 440, 445 are low, the calculated quality score for the media 425 may be an average quality score value.

Figure 4C:
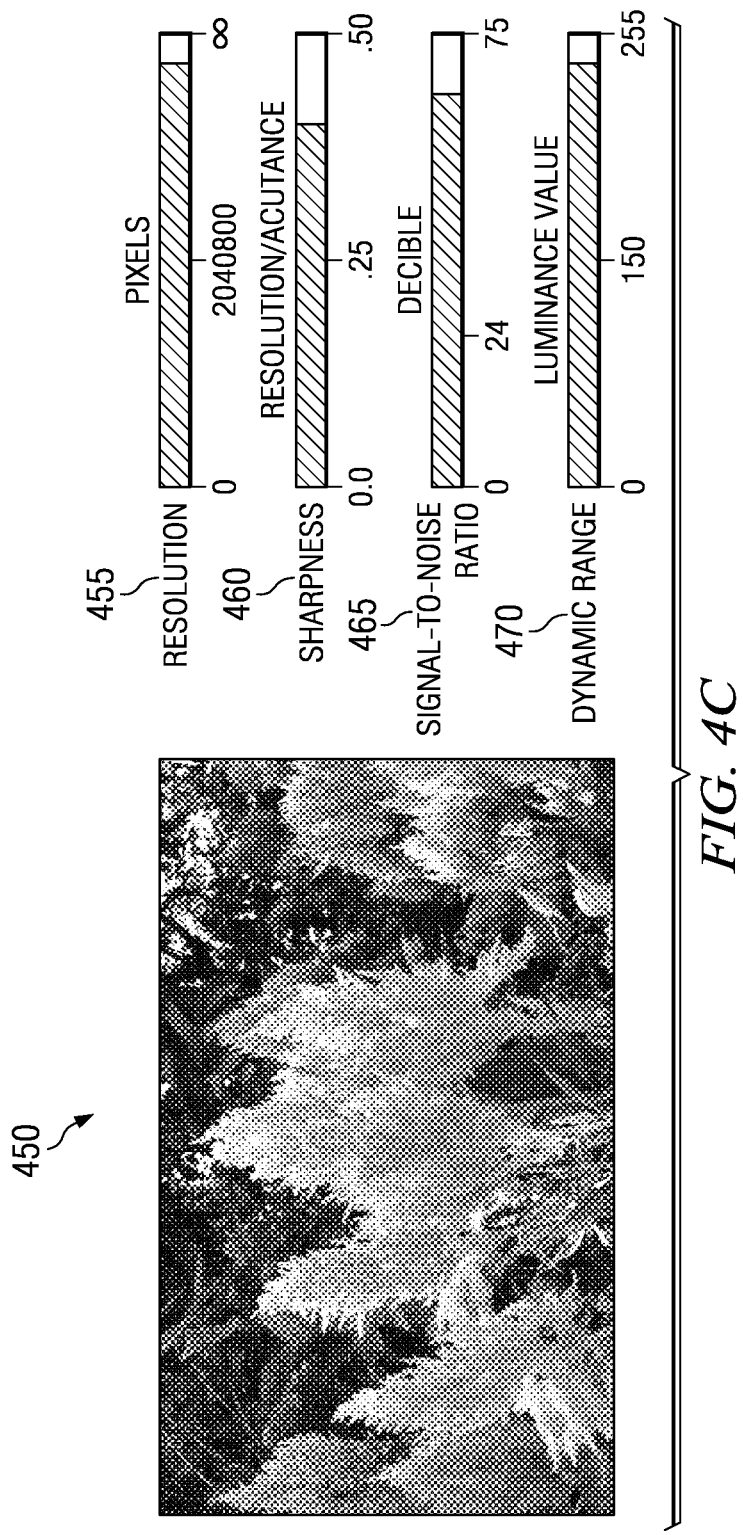
FIG. 4C is a diagram depicting yet another media with assigned values for quality parameters in accordance with an example embodiment of the invention.

FIG. 4C is a diagram depicting yet another media 450 with assigned values for quality parameters in accordance with an example embodiment of the invention. For example, FIG. 4C presents a media 450 and/or respective quality parameters, resolution 455, sharpness 460, signal-to-noise ratio 465, and dynamic range 470. The values for each quality parameter 455, 460, 465, 470 may be determined by performing embodiments of the invention. In this example, the resolution 455 has a pixel value above 204800, which may represent a good resolution 455. Further, the sharpness 460 has a resolution/acutance value above 0.25, which may represent a good sharpness 460. The signal-to-noise ratio 465 has a decibel value above 24 decibels, which may represent a good signal-to-noise ratio 465. The dynamic range 470 has a luminance value greater than 150, which may represent a good dynamic range 470. Embodiments of the invention calculate a quality score, as described above, based at least in part on the quality parameters 455, 460, 465, 470. Since several quality parameters 455, 460, 465, 470 are good, the calculated quality score for the media 450 may be a good quality score value.

Without in any way limiting the scope, interpretation, or application of the claims appearing below, it is possible that a technical effect of one or more of the example embodiments disclosed herein is to search media based at least in part on quality of the media. Another possible technical effect of one or more of the example embodiments disclosed herein is a more efficient searching for a user, e.g., less searching for quality media on slower processing devices.

Embodiments of the present invention may be implemented in software, hardware, application logic or a combination of software, hardware and application logic. The software, application logic and/or hardware may reside on a server, an electronic device, or a service. If desired, part of the software, application logic and/or hardware may reside on an electronic device, part of the software, application logic and/or hardware may reside on server, and part of the software, application logic and/or hardware may reside on service. The application logic, software or an instruction set is preferably maintained on any one of various conventional computer-readable media. In the context of this document, a "computer-readable medium" may be any media or means that can contain, store, communicate, propagate or transport the instructions for use by or in connection with an instruction execution system, apparatus, or device.

If desired, the different functions discussed herein may be performed in any order and/or concurrently with each other. Furthermore, if desired, one or more of the above-described functions may be optional or may be combined.

Although various aspects of the invention are set out in the independent claims, other aspects of the invention comprise any combination of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method, comprising:
   determining, by a processor, at least one quality parameter for a media;
   assigning a value to each quality parameter of the media;
   comparing the at least one quality parameter of the media to one or more quality parameters of a reference media, wherein at least one of the one or more quality parameters of the reference media represents a user's quality parameter preference;
   monitoring the user's quality parameter preference to determine the quality parameter of the reference media;
   updating the quality parameter of the reference media based on the user's quality parameter preference;
   adapting the quality parameter of the reference media;
   calculating a quality score for the media based at least in part on the comparison of the quality parameter of the media to the quality parameter of the reference media;
   receiving a search request, wherein the quality score is calculated prior to the receipt of the search request; and
   transmitting search results based at least in part on the quality score of the media.

2. The method of claim 1 wherein assigning a value further comprises applying at least one of the following: a piecewise linear function, a transcendental function, fuzzy logic, an algebraic function, or a polynomial function.

3. The method of claim 1 wherein the search request is based at least in part on one of the following: the quality score, a keyword, a title, a description text, or a combination thereof.

4. The method of claim 1 further comprising sorting the media based at least in part on a ranking.

5. The method of claim 1 further comprising storing the quality score in a database.

6. The method of claim 1 wherein the quality parameter is at least one of the following: resolution, sharpness, signal-to-noise ratio, dynamic range, or combination thereof.

7. The method of claim 1 wherein the media is an image or a video.

8. The method of claim 1 wherein calculating a quality score further comprises:
   applying a weight to the value of each quality parameter; and
   combining the weighted value of each quality parameter using a combination technique.

9. The method of claim 8 wherein the combination technique is at least one of the following: adding the weight value of each quality parameter, multiplying the weight value of each quality parameter, or using fuzzy logic.

10. An apparatus, comprising:
    a processor configured to:
    determine at least one quality parameter for a media;
    assign a value to each quality parameter of the media;
    compare the at least one quality parameter of the media to one or more quality parameters of a reference media, wherein at least one of the one or more quality parameters of the reference media represents a user's quality parameter preference;
    monitor the user's quality parameter preference to determine the quality parameter of the reference media;
    update the quality parameter of the reference media based on the user's quality parameter preference;
    adapt the quality parameter of the reference media;
    calculate a quality score for the media based at least in part on the comparison of the quality parameter of the media to the quality parameter of the reference media;
    receive a search request, wherein the quality score is calculated prior to the receipt of the search request; and
    transmit search results based at least in part on the quality score of the media.

11. The apparatus of claim 10 wherein the processor is further configured to apply at least one of the following: a piecewise linear function, a transcendental function, fuzzy logic, an algebraic function, or a polynomial function.

12. The apparatus of claim 10 wherein the search request is based at least in part on one of the following: the quality score, a keyword, a title, a description text, or a combination thereof.

13. The apparatus of claim 10 wherein the processor is further configured to sort the media based at least in part on a ranking.

14. The apparatus of claim 10 wherein the processor is further configured to store the quality score in a database.

15. The apparatus of claim 10 wherein the quality parameter is at least one of the following: resolution, sharpness, signal-to-noise ratio, dynamic range, or combination thereof.

16. The apparatus of claim 10 wherein the media is an image or a video.

17. The apparatus of claim 10 wherein the processor is further configured to:
    applying a weight to the value of each quality parameter; and
    combining the weighted value of each quality parameter using a combination technique.

18. The apparatus of claim 17 wherein the combination technique is at least one of the following: add the weight value of each quality parameter, multiply the weight value of each quality parameter, or use fuzzy logic.

19. A computer program product comprising a non-transitory computer-readable medium bearing computer program code embodied therein for use with a computer, the computer program code comprising:
   code for determining at least one quality parameter for a media;
   code for assigning a value to each quality parameter of the media;
   code for comparing the at least one quality parameter of the media to one or more quality parameters of a reference media, wherein at least one of the one or more quality parameters of the reference media represents a user's quality parameter preference;
   code for monitoring the user's quality parameter preference to determine the quality parameter of the reference media;
   code for updating the quality parameter of the reference media based on the user's quality parameter preference;
   code for adapting the quality parameter of the reference media;
   code for calculating a quality score for the media based at least in part on the comparison of the quality parameter of the media to the quality parameter of the reference media;
   code for receiving a search request, wherein the quality score is calculated prior to the receipt of the search request; and
   code for transmitting search results based at least in part on the quality score of the media.

20. A non-transitory computer-readable medium carrying one or more sequences of one or more instructions which, when executed by one or more processors, cause an apparatus to at least perform the following steps:
   determining at least one quality parameter for a media;
   assigning a value to each quality parameter of the media;
   comparing the at least one quality parameter of the media to one or more quality parameters of a reference media, wherein at least one of the one or more quality parameters of the reference media represents a user's quality parameter preference;
   monitoring the user's quality parameter preference to determine the quality parameter of the reference media;
   updating the quality parameter of the reference media based on the user's quality parameter preference;
   adapting the quality parameter of the reference media;
   calculating a quality score for the media based at least in part on the comparison of the quality parameter of the media to the quality parameter of the reference media;
   receiving a search request, wherein the quality score is calculated prior to the receipt of the search request; and
   transmitting search results based at least in part on the quality score of the media.

* * * * *